US011982526B2

(12) United States Patent
Hammerschmidt

(10) Patent No.: US 11,982,526 B2
(45) Date of Patent: May 14, 2024

(54) SAFETY MECHANISM FOR HIGH AVAILABILITY ANGLE SENSOR

(71) Applicant: Infineon Technologies AG, Neubiberg (DE)

(72) Inventor: Dirk Hammerschmidt, Finkenstein (AT)

(73) Assignee: Infineon Technologies AG, Neubiberg (DE)

( * ) Notice: Subject to any disclaimer, the term of this patent is extended or adjusted under 35 U.S.C. 154(b) by 403 days.

(21) Appl. No.: 17/304,441

(22) Filed: Jun. 21, 2021

(65) Prior Publication Data

US 2022/0404136 A1    Dec. 22, 2022

(51) Int. Cl.
*G01B 7/30* (2006.01)
*G01D 5/14* (2006.01)
*G01D 5/16* (2006.01)
*G01D 5/20* (2006.01)

(52) U.S. Cl.
CPC ............... *G01B 7/30* (2013.01); *G01D 5/145* (2013.01); *G01D 5/16* (2013.01); *G01D 5/20* (2013.01)

(58) Field of Classification Search
CPC . G01B 7/30; G01D 5/145; G01D 5/16; G01D 5/20
See application file for complete search history.

(56) References Cited

U.S. PATENT DOCUMENTS

| | | | |
|---|---|---|---|
| 8,699,371 B2 | 4/2014 | Reidl et al. | |
| 10,126,147 B2* | 11/2018 | Fujita | G01D 5/145 |
| 10,359,478 B2* | 7/2019 | Onaka | G01R 33/07 |
| 2022/0001924 A1* | 1/2022 | Pádár | G01B 7/30 |
| 2022/0041214 A1* | 2/2022 | Pádár | G01D 5/16 |

* cited by examiner

*Primary Examiner* — Walter L Lindsay, Jr.
*Assistant Examiner* — Milton Gonzalez
(74) *Attorney, Agent, or Firm* — Harrity & Harrity, LLP

(57) ABSTRACT

In some implementations, an angle sensor may determine an angular position of an object based on first sensor values received from a first set of sensing elements. The first sensor values include a first x-component of a magnetic field and a first y-component of the magnetic field. The angle sensor may determine the angular position of the object based on second sensor values received from a second set of sensing elements. The second sensor values include a second x-component of the magnetic field and a second y-component of the magnetic field. The angle sensor may perform a set of safety checks, including performing an x-component check based on the first x-component and the second x-component and performing a y-component check based on the first y-component and the second y-component. The angle sensor may provide an indication of a result of the set of safety checks.

20 Claims, 7 Drawing Sheets

SAFETY MECHANISM FOR HIGH AVAILABILITY ANGLE SENSOR

BACKGROUND

An angle sensor may include a set of sensing components that sense a strength of different components (e.g., an x-component and a y-component) of a magnetic field produced or distorted by a target object. The angle sensor may determine an angular position of the target object based on the strength of the components of the magnetic field and may provide an output that indicates the angular position as determined by the angle sensor.

SUMMARY

In some implementations, an angle sensor includes a first angle measurement path to determine an angular position based on first sensor values from a first set of sensing elements, wherein the first sensor values include a first x-component of a magnetic field and a first y-component of the magnetic field; a second angle measurement path to determine the angular position based on second sensor values from a second set of sensing elements, wherein the second sensor values include a second x-component of the magnetic field and a second y-component of the magnetic field; a safety path to perform a set of safety checks, the set of safety checks including: an x-component check based on the first x-component and the second x-component, and a y-component check based on the first y-component and the second y-component; and an output component to provide an indication of a result of the set of safety checks.

In some implementations, a sensor system includes a first set of sensing elements to obtain first sensor values associated with a rotation of an object, wherein the first sensor values include a first x-component of a magnetic field and a first y-component of the magnetic field; a second set of sensing elements to obtain second sensor values associated with the rotation of the object, wherein the second sensor values include a second x-component of the magnetic field and a second y-component of the magnetic field; a first angle measurement path to determine an angular position based on the first sensor values; a second angle measurement path to determine the angular position based on the second sensor values; a safety path to perform a set of safety checks, the set of safety checks including: an x-component check based on the first x-component and the second x-component, and a y-component check based on the first y-component and the second y-component; and an output component to provide an indication of a result of the set of safety checks.

In some implementations, a method includes determining, by a system, an angular position of an object based on first sensor values received from a first set of sensing elements, wherein the first sensor values include a first x-component of a magnetic field and a first y-component of the magnetic field; determining, by the system, the angular position of the object based on second sensor values received from a second set of sensing elements, wherein the second sensor values include a second x-component of the magnetic field and a second y-component of the magnetic field; performing, by the system, a set of safety checks, wherein performing the set of safety checks includes: performing an x-component check based on the first x-component and the second x-component, and performing a y-component check based on the first y-component and the second y-component; and providing, by the system, an indication of a result of the set of safety checks.

DETAILED DESCRIPTION

Figure 1A:
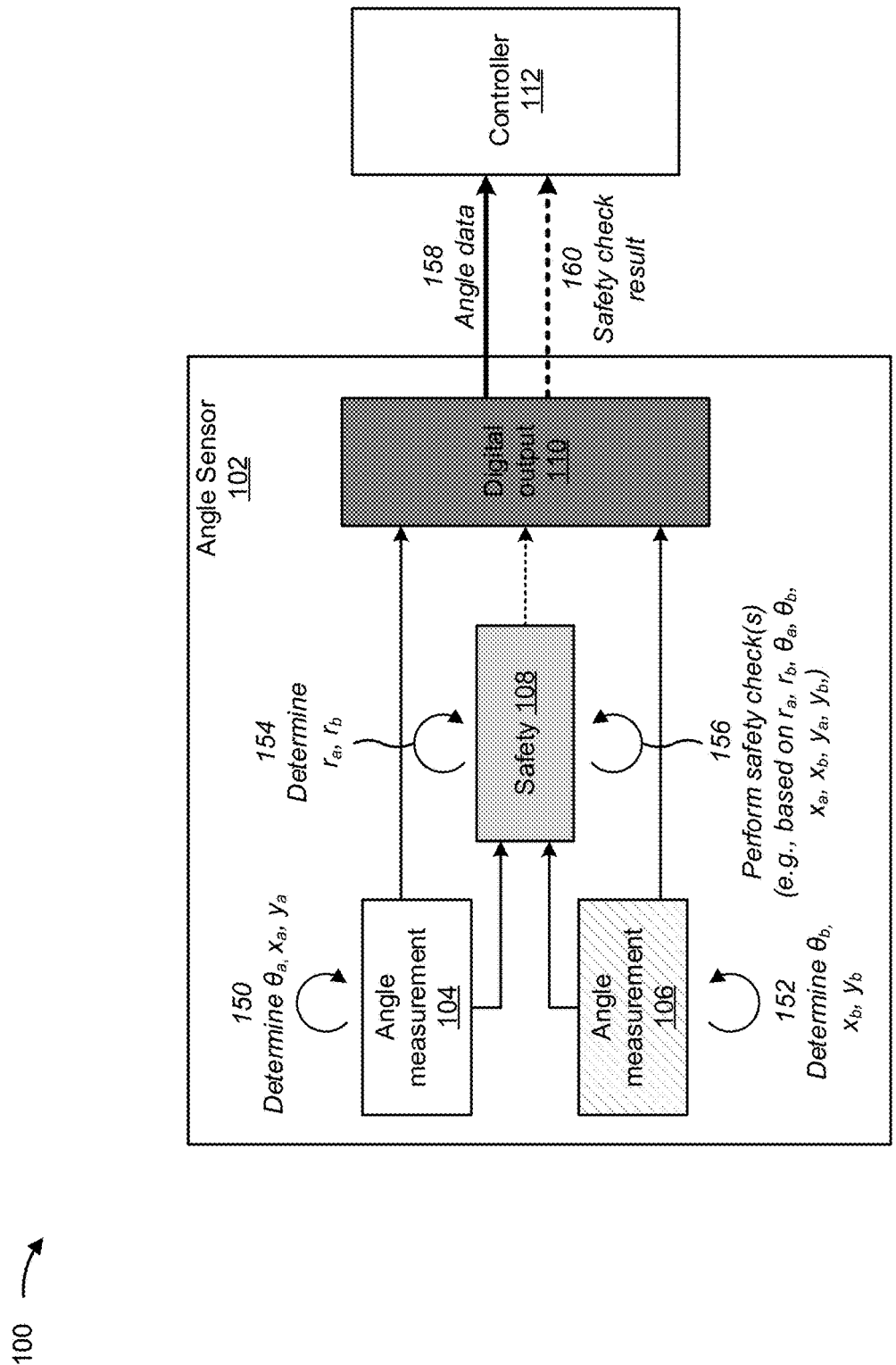
FIGS. 1A and 1B are diagrams associated with example operations of a system comprising a safety mechanism for an angle sensor, as described herein.

The following detailed description of example implementations refers to the accompanying drawings. The same reference numbers in different drawings may identify the same or similar elements.

An angle sensor may be designed to determine an angular position of a target object (e.g., a rotatable object) in a given application. For example, an angle sensor may be used in an electronic power steering (EPS) application to determine an angular position of a steering column. In some applications, it may be necessary to ensure functional safety of the angle sensor.

In general, functional safety can be defined as an absence of unreasonable risk (e.g., to a system, to an environment, to people, and/or the like) due to hazards caused by malfunctioning behavior (e.g., a systematic failure, a random failure, or the like) of the angle sensor. In the automotive context, an Automotive Safety Integrity Level (ASIL) scheme is used to dictate functional safety requirements for an angle sensor. The ASIL scheme is a risk classification scheme defined by the International Organization for Standardization (ISO) 26262 standard (titled Functional Safety for Road Vehicles), which provides a standard for functional safety of electrical and/or electronic systems in production automobiles. An ASIL classification defines safety requirements necessary to be in line with the ISO 26262 standard. An ASIL is established by performing a risk analysis of a potential hazard by looking at severity, exposure, and controllability of a vehicle operating scenario. A safety goal for that hazard in turn guides the ASIL requirements. There are four ASILs identified by the standard: ASIL A, ASIL B, ASIL C, ASIL D. ASIL D dictates the highest integrity requirements, while ASIL A dictates the lowest. A hazard with a risk that is low (and, therefore, does not require safety measures in accordance with ISO 26262) is identified as quality management (QM). In some cases, it is desirable or required that an angle sensor achieves a high ASIL. For example, it may be desirable or required that an angle sensor used in a given application achieves ASIL B, ASIL C, or ASIL D. To ensure functional safety in an angle sensor, a safety mechanism that allows malfunctioning behavior to be identified and signaled should be implemented.

Some implementations described herein provide a safety mechanism for an angle sensor. In some implementations, the angle sensor includes a first angle measurement path to determine an angular position based on sensor values from a first set of sensing elements, and a second angle measurement path to determine the angular position based on sensor values from a second set of sensing elements. The first and second sets of sensing elements may be the same or different types of sensing elements. For example, the first set of sensing elements may be a set of magnetoresistive (MR) sensing elements (e.g., a set of anisotropic magnetoresistance (AMR) elements, giant magnetoresistance (GMR) elements, tunnel magnetoresistance (TMR) elements, or the like) and the second set of sensing elements may be the same set of MR sensing elements, a different set of MR sensing elements, or a set of Hall-based sensing elements (e.g., a set of sensing elements that operate based on the Hall effect).

Each of the first and second sets of sensing elements may include one or more components configured to obtain respective sets of sensor values for determining an angular position of a target object. A set of sensor values may include a value of a signal indicating a y-component of the angular position (also referred to as a sine value) and a value of a signal indicating an x-component of the angular position (also referred to a cosine value). The angle sensor includes a safety path to perform a set of safety checks associated with the first angle measurement path and/or the second angle measurement path based on the sine values and the cosine values measured by the first and second sets of sensing elements. The set of safety checks may include an x-component check that compares a cosine value received from the first angle measurement path and a cosine value received from the second angle measurement path. The set of safety checks may also include a y-component check that compares a sine value received from the first angle measurement path and a sine value received from the second angle measurement path. In some implementations, the safety path enables a failure (e.g., in the first angle measurement path or in the second angle measurement path) path to be detected, thereby improving functional safety of the angle sensor.

Figure 1B:
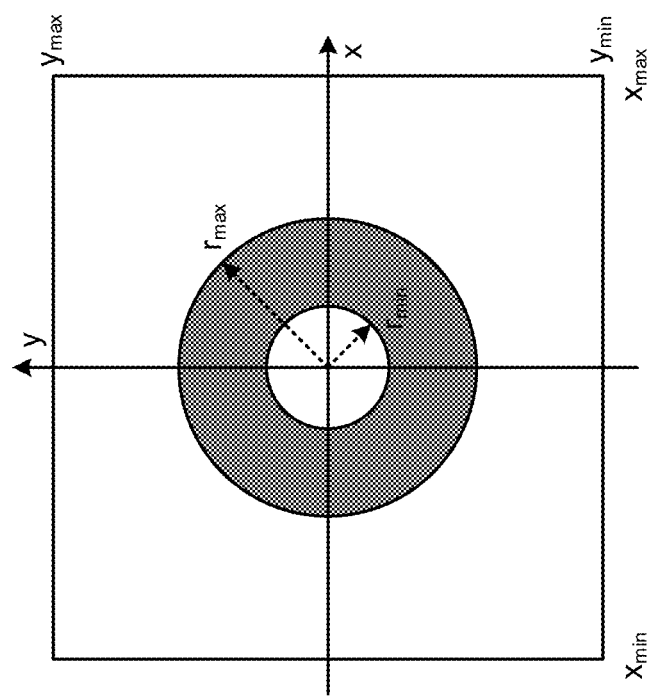

FIGS. 1A and 1B are diagrams associated with example operations of a system 100 comprising a safety mechanism for an angle sensor 102, as described herein. As shown in FIG. 1A, the system 100 includes the angle sensor 102 comprising an angle measurement path 104, an angle measurement path 106, a safety path 108, and a digital output component 110. As further shown, the system 100 includes a controller 112. The components of the system 100 are described below, followed by a description of an example operation of the system 100. In some implementations, the angle measurement path 104, the angle measurement path 106, and the safety path 108 are integrated on a monolithic semiconductor device (e.g., a single chip).

An angle measurement path (e.g., the angle measurement path 104, the angle measurement path 106) includes one or more components associated with determining an angular position θ (theta) of a target object (not shown) based on a set of sensor values. For example, the set of sensor values can include a value of a signal indicating a y-component of the angular position θ (also referred to as a sine value) and a value of a signal indicating an x-component of the angular position θ (also referred to as a cosine value). Here, a given angle measurement path may determine an angular position θ of the target object based on the y-component and the x-component (e.g., by calculating an arctangent of the y-component divided by the x-component).

In some implementations, the angle measurement path 104 and the angle measurement path 106 utilize the same type of sensing elements. In some implementations, the angle measurement path 104 and the angle measurement path 106 utilize different types of sensing elements, meaning that the angle measurement path 104 and the angle measurement path 106 are diverse measurement paths. In some implementations, a measurement range on the angle measurement path 104 is different from a measurement range on the angle measurement path 106.

The safety path 108 includes one or more components associated with performing one or more safety checks associated with the angle sensor 102. In some implementations, the one or more safety checks include an x-component check and a y-component check. Additional details regarding example implementations of the x-component check and the y-component check are provided below with respect to FIGS. 2A-2C. In some implementations, the one or more safety checks include a vector length check associated with the angle measurement path 104. In some implementations, the one or more safety checks include a vector length check associated with the angle measurement path 106. In some implementations, the one or more safety checks include a comparison check associated with the angular position θ as determined on the angle measurement path 104 and the angular position θ as determined on the angle measurement path 106.

In some implementations, as shown in FIG. 1A, the safety path 108 is configured to receive sensor values (e.g., a sine value and a cosine value) from the angle measurement path 104, sensor values from the angle measurement path 106, information associated with a vector length $r_a$ associated with the sensor values from the angle measurement path 104, information associated with a vector length $r_b$ associated with the sensor values from the angle measurement path 106, information associated with the angular position $θ_a$ determined on the angle measurement path 104, information associated with the angular position $θ_b$ determined in the angle measurement path 106, and/or one or more items of information in association with performing the one or more safety checks, as described herein. In some implementations, the safety path 108 is configured to provide a safety indication (e.g., a failure indication, an error indication, a deactivation indication, an OK indication, or the like) to the digital output component 110.

The digital output component 110 includes one or more components associated with generating and transmitting one or more outputs (e.g., an output carrying sensor data, an output carrying an indication of a result of the one or more safety checks, or the like). In some implementations, as shown in FIG. 1A, the digital output component 110 may receive one or more signals from the angle measurement path 104, the angle measurement path 106, and the safety path 108, and may generate and transmit the one or more outputs accordingly. In some implementations, the digital output component 110 transmits the one or more outputs to the controller 112.

The controller 112 includes one or more components associated with controlling one or more electrical systems and/or electrical subsystems based on information provided by the sensor 102. The controller 112 may include, for example, a microcontroller (μC) or an electronic control unit (ECU), among other examples. In some implementations, the controller 112 may be capable of calibrating, controlling, adjusting, and/or the like, the one or more electrical systems and/or electrical subsystems based on information received from the sensor 102. For example, in some implementations, the controller 112 may be configured to determine an angular position θ of the target object and/or one or more other items of information (e.g., a rotational speed of the target object, a rotational direction of the target object, or the like), determine information associated with the one or more safety checks for the sensor 102, and/or provide such information or perform one or more operations in association with controlling the one or more electrical systems and/or electrical subsystems based on such information. In some implementations, the controller 112 is connected to the sensor 102 such that the controller 112 can receive information (e.g., one or more signals) from the sensor 102 via one or more transmission interfaces and/or via one or more output terminals.

An example operation of the system 100 is illustrated in FIG. 1A. As shown by reference 150, the angle measurement path 104 determines an angular position $\theta_a$. In some implementations, the angle measurement path 104 determines the angular position $\theta_a$ based on sensor values provided by the set of sensing elements on the angle measurement path 104 (e.g., a set of MR sensing elements, such as a set of AMR sensing elements). In some implementations, the angle measurement path 104 provides one or more signals to the safety path 108. The one or more signals provided by the angle measurement path 104 to the safety path 108 may include, for example, one or more signals indicating the sensor values from the angle measurement path 104 (e.g., an x-component value $x_a$ and a y-component value $y_a$), a vector length $r_a$ computed from the sensor values (e.g., when the angle measurement path 104 is configured to compute the vector length $r_a$), and/or the angular position $\theta_a$. Further, in some implementations, the angle measurement path 104 provides a signal indicating the angular position $\theta_a$ to the digital output component 110.

As shown by reference 152, the angle measurement path 106 determines an angular position $\theta_b$. In some implementations, the angle measurement path 106 determines the angular position $\theta_b$ based on sensor values provided by the set of sensing elements on the angle measurement path 106 (e.g., a set of Hall-based sensing elements or a set of MR sensing elements, such as a set of GMR sensing elements or TMR sensing elements). In some implementations, the angle measurement path 106 provides one or more signals to the safety path 108. The one or more signals provided by the angle measurement path 106 to the safety path 108 may include, for example, one or more signals indicating the sensor values from the angle measurement path 106 (e.g., an x-component value $x_b$ and a y-component value $y_b$), a vector length $r_b$ computed from the sensor values (e.g., when the angle measurement path 106 is configured to compute the vector length $r_b$), and/or the angular position $\theta_b$. Further, in some implementations, the angle measurement path 106 provides a signal indicating the angular position $\theta_b$ to the digital output component 110.

As shown by reference 154, the safety path 108 determines the vector length $r_a$ associated with the angle measurement path 104 and the vector length $r_b$ associated with the angle measurement path 106. In some implementations, the safety path 108 determines the vector length $r_a$ by receiving an indication of the vector length $r_a$ from the angle measurement path 104, as described above (e.g., when the angle measurement path 104 is configured to compute the vector length $r_a$). Alternatively, in some implementations, the safety path 108 determines the vector length $r_a$ by computing the vector length $r_a$ based on the sensor values received from the angle measurement path 104. Similarly, the safety path 108 determines the vector length $r_b$ by receiving an indication of the vector length $r_b$ from the angle measurement path 106, as described above (e.g., when the angle measurement path 106 is configured to compute the vector length $r_b$). Alternatively, in some implementations, the safety path 108 determines the vector length $r_b$ by computing the vector length $r_b$ based on the sensor values received from the angle measurement path 106.

In some implementations, a given vector length r (e.g., the vector length $r_a$, the vector length $r_b$) is determined using the following equation:

$$r = \mathrm{sqrt}(X^2 + Y^2)$$

where X is the x-component of the angular position $\theta$, and Y is the y-component of the angular position $\theta$. That is, the vector length r corresponds to a magnitude of the electrical vector, whose elements are given by the x-component (cosine) channel and the y-component (sine) channel of a given angle measurement path. Notably, the vector length r is independent of the angular position $\theta$.

As shown by reference 156, the safety path 108 performs one or more safety checks. In some implementations, a safety check performed by the safety path 108 is based on the x-component value $x_a$ received from the angle measurement path 104 and the x-component value $x_b$ received from the angle measurement path 106. For example, the safety path 108 may perform a safety check based on comparing the x-component value $x_a$ received from the angle measurement path 104 and the x-component value $x_b$ received from the angle measurement path 106.

In some implementations, as described in greater detail below with respect to FIGS. 2A-2C, the safety path 108 performs the comparison of the x-component value $x_a$ and the x-component value $x_b$ by determining whether the x-component value $x_a$ (e.g., the cosine value determined on the angle measurement path 104) matches the x-component value $x_b$ (e.g., the cosine value determined on the angle measurement path 106). That is, the safety path 108 may perform the comparison by determining whether a difference between the x-component value $x_a$ and the x-component value $x_b$ is less than a threshold value (e.g., a tolerance value). In some implementations, information indicating the threshold value may be stored on the memory of the sensor 102. During operation, the safety path 108 may compare the computed difference between the x-component value $x_a$ and the x-component value $x_b$ to the threshold value. When the difference does not satisfy (e.g., is greater than) the threshold value, then the safety path 108 may, for example, signal an error to the digital output component 110.

Alternatively, and/or additionally, a safety check performed by the safety path 108 may be based on the y-component value $y_a$ received from the angle measurement path 104 and the y-component value $y_b$ received from the angle measurement path 106. For example, the safety path 108 may perform a safety check based on comparing the y-component value $x_a$ received from the angle measurement path 104 and the y-component value $x_b$ received from the angle measurement path 106.

In some implementations, as described in greater detail below with respect to FIGS. 2A-2C, the safety path 108 performs the comparison of the y-component value $y_a$ and the y-component value $y_b$ by determining whether the y-component value $y_a$ (e.g., the sine value determined on the angle measurement path 104) matches the y-component value $y_b$ (e.g., the sine value determined on the angle measurement path 106). That is, the safety path 108 may perform the comparison by determining whether a difference between the y-component value $y_a$ and the y-component value $y_b$ is less than a threshold value (e.g., a tolerance value). In some implementations, the threshold value is the same as the threshold value described above with respect to the x-component check. In some implementations, information indicating the threshold value may be stored on the memory of the sensor 102. During operation, the safety path 108 may compare the computed difference between the y-component value $y_a$ and the y-component value $y_b$ to the threshold value. When the difference does not satisfy (e.g., is greater than) the threshold value, then the safety path 108 may, for example, signal an error to the digital output component 110.

In some implementations, a safety check performed by the safety path 108 is based on the vector length $r_a$, the angular position $\theta_a$, the vector length $r_b$, and/or the angular position $\theta_b$. In some implementations, the one or more safety checks include one or more vector length checks. For example, the one or more safety checks may include a vector length check associated with the vector length $r_a$ and/or a vector length check associated with the vector length $r_b$. In an ideal scenario, a given vector length r (e.g., the vector length $r_a$, the vector length $r_b$) remains constant during operation of the sensor 102 (e.g., due to the principle that $\cos^2\theta + \sin^2\theta = 1$). If, for example, a sensor channel (e.g., the x-component channel or the y-component channel) of a given angle measurement path (e.g., the angle measurement path 104 or the angle measurement path 106) experiences a stuck-at fault, the vector length r will change as function of the angle $\theta$. This change in the vector length r can be detected by the vector length check performed by the safety path 108. Therefore, when performing the vector length check, the safety path 108 determines whether the vector length r stays within an allowable vector length range (e.g., a vector length range defined by a minimum vector length $r_{min}$, and a maximum vector length $r_{max}$). FIG. 1B is a diagram illustrating a visualization of a vector length check. In the visualization shown in FIG. 1B, the vector length check is a determination of whether the vector length r is within the shaded region defined by the minimum vector length ram, and the maximum vector length $r_{max}$.

Notably, digital signal processing performed by the sensor 102 can provide compensation for imperfections of components of the sensor 102 (e.g., the set of sensing elements, one or more analog-to-digital converters (ADCs), or the like). For example, a digital signal processor (DSP) of the sensor 102 may receive raw (i.e., uncompensated) sensor values as input, perform compensation, and output compensated sensor values. Parameters for this compensation can be based on calibration and/or autocalibration. For example, offsets of the raw sensor values can drift with temperature. Here, relevant parameters to compensate such drifts can be determined during end-of-line testing (i.e., calibration) and stored in a memory (e.g., a non-volatile memory (NVM)) of the sensor 102. These parameters can then be used during operation of the sensor 102 for providing compensation, which leads to reduced offsets of the compensated sensor values over temperature. Notably, a well-compensated angle measurement path shows negligible variation in amplitude of sensor values and, therefore, the vector length r associated with the given angle measurement path may be independent of temperature. Additionally, for saturated sensing elements (e.g., MR sensing elements), the vector length r does not depend significantly on a magnitude of the magnetic field. In some implementations, the minimum vector length $r_{min}$ and the maximum vector length $r_{max}$ can be determined based on taking such variations and margins into consideration. That is, the allowable vector length range can be smaller for a well-compensated sensor 102 (e.g., as compared to an angle sensor with no or poor compensation), thereby improving functional safety of the sensor 102.

In some implementations, the minimum vector length $r_{min}$ and the maximum vector length $r_{max}$ are stored in the memory of the sensor 102 (e.g., after calibration). During operation, the safety path 108 compares the computed vector length r to the stored minimum vector length $r_{min}$, and maximum vector length $r_{max}$. Here, if the vector length r is not within the allowable vector length range (i.e., if the computed vector length is less than the minimum vector length $r_{min}$, or is greater than the maximum vector length $r_{max}$), then the safety path 108 may, for example, signal an error to the digital output component 110.

In some implementations, the safety path 108 performs a vector length check associated with the angle measurement path 104. That is, the safety path 108 may determine whether the vector length $r_a$ is within an allowable vector length range. Additionally, or alternatively, in some implementations, the safety path 108 performs a vector length check associated with the angle measurement path 106. That is, the safety path 108 may determine whether the vector length $r_b$ is within an allowable vector length range (e.g., the same allowable vector length range as used for the check of the vector length $r_a$ or a different allowable vector length range than that used for the check of the vector length $r_a$).

In some implementations, the one or more safety checks include a comparison check associated with the angular position $\theta_a$ and the angular position $\theta_b$. In some implementations, the safety path 108 performs the comparison check by determining whether the angular position $\theta_a$(e.g., the angular position determined on the angle measurement path 104) matches the angular position $\theta_b$ (e.g., the angular position determined on the angle measurement path 106). That is, the safety path 108 may perform the comparison check by determining whether a difference between the angular position $\theta_a$ and the angular position $\theta_b$ is less than a threshold value (e.g., a tolerance value). In some implementations, information indicating the threshold may be stored on the memory of the sensor 102. During operation, the safety path 108 compares the computed difference between the angular position $\theta_a$ and the angular position $\theta_b$ to the threshold. Here, if the difference does not satisfy (e.g., is greater than) the threshold, then the safety path 108 may, for example, signal an error to the digital output component 110.

In some implementations, the safety path 108 provides information indicating a result of the one or more safety checks to the digital output component 110. For example, as indicated above, the safety path 108 may provide an indication of an error associated with the x-component check, an error associated with the y-component check, an error associated with the vector length check associated with the angle measurement path 104, an error associated with the vector length check associated with the angle measurement path 106, and/or an error associated with the comparison check. As another example, the safety path 108 may provide an indication that a given safety check has passed (e.g., an indication that the angle measurement path 104 and/or the angle measurement path 106 has passed the x-component check, an indication that the angle measurement path 104 and/or the angle measurement path 106 has passed the y-component check, an indication that the angle measurement path 104 has passed the vector length check, an indication that the angle measurement path 106 has passed the vector length check, and/or an indication that the angle measurement paths 104/106 have passed the comparison check).

Returning to FIG. 1A, as shown by reference numbers 158 and 160, the digital output component 110 may provide angle data and an indication of a result of the one or more safety checks to the controller 112. In some implementations, the angle data includes an indication of the angular position $\theta_a$ and/or an indication of the angular position $\theta_b$. In some implementations, the indication of the result of the one or more safety checks may include an indication of whether a given safety check has failed or passed. Alternatively, in some implementations, the indication of the result of the safety check may include an indication that a given safety check has failed (i.e., the digital output component 110 may provide an indication for the given safety check only when the given safety check fails).

As indicated above, FIGS. 1A and 1B are provided as examples. Other examples may differ from what is described with regard to FIGS. 1A and 1B. Further, the number and arrangement of components shown in FIG. 1A are provided as an example. In practice, there may be additional components, fewer components, different components, or differently arranged components than those shown in FIG. 1A. Furthermore, two or more components shown in FIG. 1A may be implemented within a single component, or a single component shown in FIG. 1A may be implemented as multiple, distributed components. Additionally, or alternatively, a set of components (e.g., one or more components) shown in FIG. 1A may perform one or more functions described as being performed by another set of components shown in FIG. 1A.

Figure 2A:
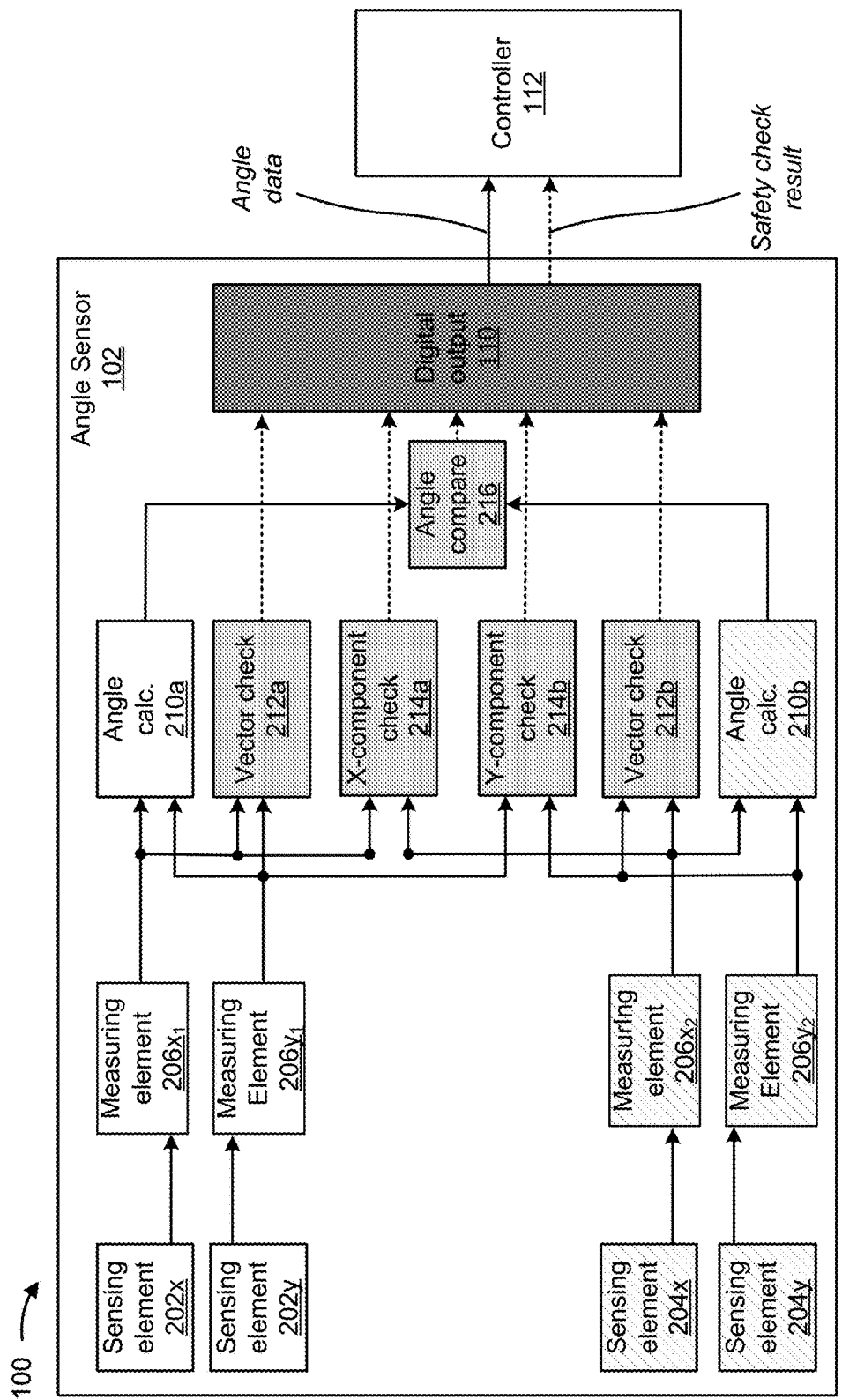
FIGS. 2A-2C are diagrams of example implementations of the system comprising the safety mechanism for an angle sensor, as described herein.
Figure 2B:
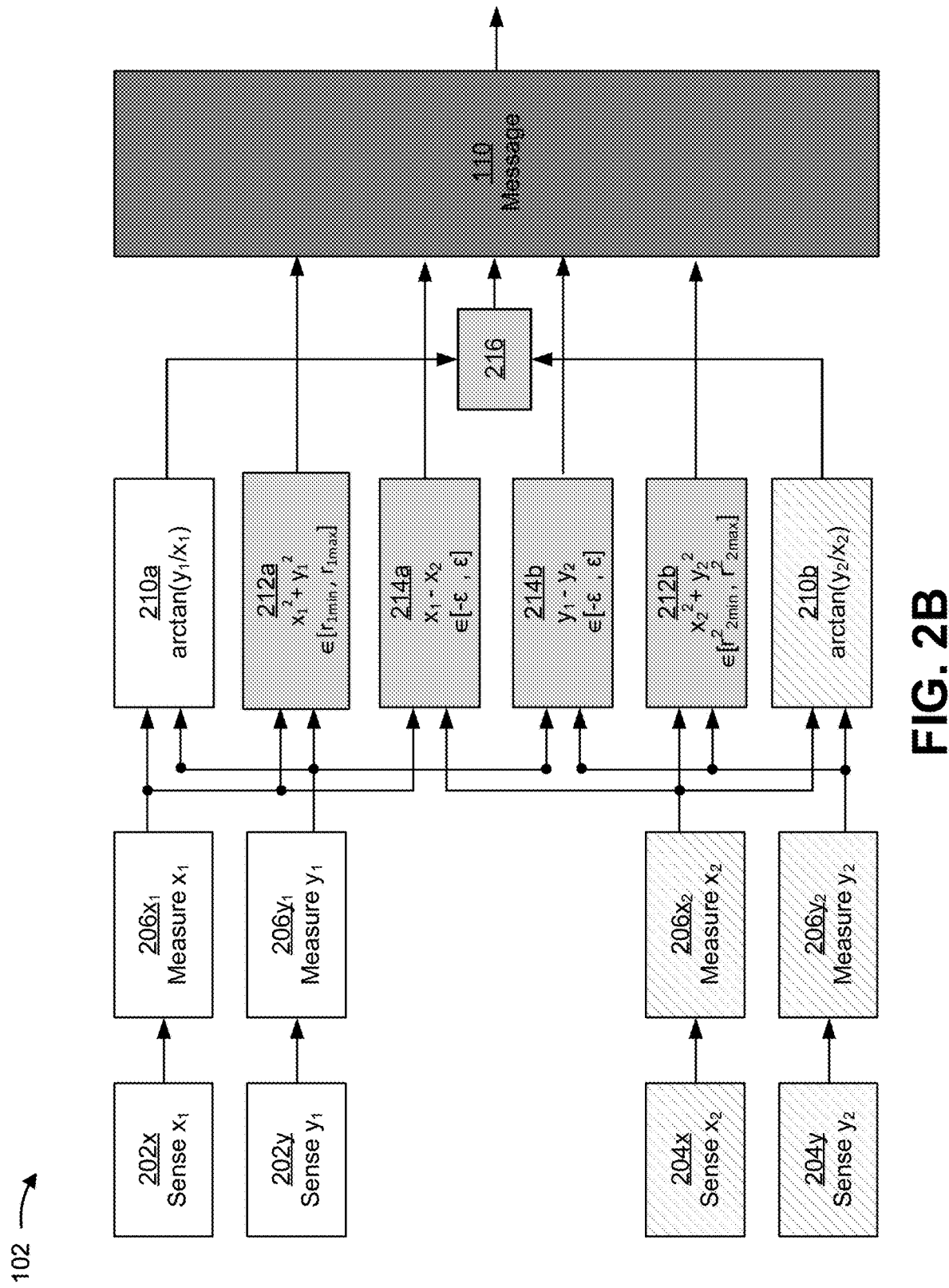
Figure 2C:
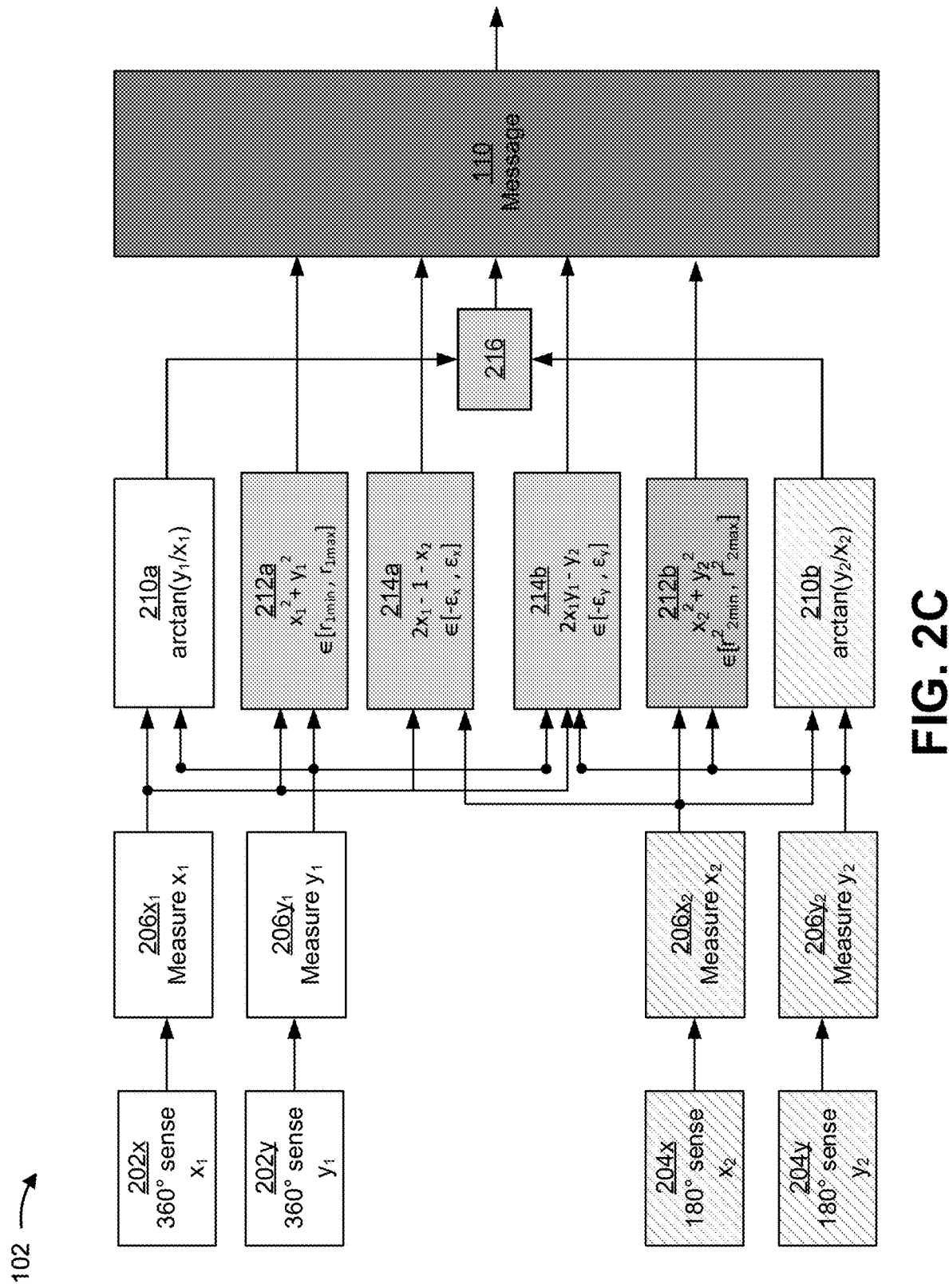

FIGS. 2A-2C are diagrams of example implementations of the system 100 comprising a safety mechanism (e.g., safety path 108) for an angle sensor (e.g., angle sensor 102), as described herein. In FIGS. 2A-2C, components of the angle measurement path 104 are indicated by a white color, components of the angle measurement path 106 are indicated by a hatched pattern, components of the safety path 108 are indicated by a light gray color, and the digital output component is indicated by a dark gray color. Additionally, the safety path 108 includes one or more vector length check components 212 (e.g., a vector length check component 212a, a vector length check component 212b), an x-component check component 214a, a y-component check component 214b, and an angle comparison component 216.

Generally, as illustrated in FIGS. 2A-2C for example, the angle measurement path 104 includes a set of sensing elements 202 (e.g., a sensing element 202x for sensing the x-component of a magnetic field and a sensing element 202y for sensing the y-component of the magnetic field), a set of measuring elements 206 (e.g., a measuring element $206x_1$ for measuring the x-component sensed by the sensing element 202x and a measuring element $206y_1$ for measuring the y-component sensed by the sensing element 202y), and an angle calculation component 210a. Similarly, the angle measurement path 106 includes a set of sensing elements 204 (e.g., a sensing element 204x for sensing the x-component of a magnetic field and a sensing element 204y for sensing the y-component of the magnetic field), a set of measuring elements 206 (e.g., a measuring element 206x2 for measuring the x-component sensed by the sensing element 204x and a measuring element 206y2 for measuring the y-component sensed by the sensing element 204y), and an angle calculation component 210b.

A set of sensing elements (e.g., the set of sensing elements 202 or the set of sensing elements 204) is a set of components for sensing a magnetic field at the angle sensor 102. In some implementations, as described above, each set of sensing elements 202/204 includes a sensing element 202/204 configured to sense an x-component of the magnetic field and a sensing element 202/204 configured to sense a y-component of the magnetic field. In some implementations, a given set of sensing elements 202/204 may include MR sensing elements, which are elements comprised of a magnetoresistive material (e.g., nickel-iron (NiFe)), where an electrical resistance of the magnetoresistive material depends on a strength and/or a direction of the magnetic field present at the magnetoresistive material. Here, the given set of sensing elements 202/204 may operate based on an AMR effect, a GMR effect, or a TMR effect, among other examples. Further, in some implementations, a given set of sensing elements 202/204 may include a set of Hall-based sensing elements that operate based on the Hall effect. In some implementations, a given sensing element 202/204 may provide an analog signal, corresponding to a strength of a component of the magnetic field, to a measuring element 206.

A measuring element 206 may include an ADC that converts analog signals from a set of sensing elements 202/204 to a digital signal. For example, the measuring element $206x_1$ may include an ADC that converts analog signals, received from the set of sensing elements 202, into digital signals to be processed by a DSP of the measuring element $206x_1$.

In some implementations, as shown in FIG. 2B, the angle measurement path 104 and the angle measurement path 106 are non-diverse measurement paths. Thus, the set of sensing elements 202 on the angle measurement path 104 and the set of sensing elements 204 on the angle measurement path 106 may be a same type of sensing elements. For example, the set of sensing elements 202 and the set of sensing elements 204 may include a set of MR sensing elements (e.g., a set of AMR elements, a set of GMR elements, or a set of TMR elements, among other examples), a set of Hall-based sensing elements (e.g., a set of sensing elements that operate based on the Hall effect), and/or the like. Further, a measurement range provided by the set of sensing elements 202 may be the same as a measurement range provided by the set of sensing elements 204. For example, the measurement range provided by the set of sensing elements 202 and the set of sensing elements 204 may be 180 degrees)(° (e.g., when the set of sensing elements 202 and the set of sensing elements are a set of AMR sensing elements) or may be 360° (e.g., when the set of sensing elements 202 and the set of sensing elements 204 are a set of GMR sensing elements, a set of TMR sensing elements, a set of Hall-based sensing elements, or the like).

As shown in FIG. 2B, the angle calculation component 210a receives the x-component value and the y-component value measured by the measuring element $206x_1$ and $206y_1$, respectively, and the angle calculation component 210a calculates the angular position $\theta_a$ by calculating an arctangent of the y-component divided by the x-component. In some implementations, the angle calculation component 210a calculates a vector length $r_a$ based on the x-component value and the y-component value, as described above. The angle calculation component 210a may provide one or more signals indicating the vector length $r_a$ computed from the x-component value and the y-component value (e.g., when the angle calculation component 210a is configured to compute the vector length $r_a$) to the vector length check component 212a and/or the one or more signals indicating the angular position $\theta_a$ to the angle compare component 216.

Similarly, the angle calculation component 210b receives the x-component value and the y-component value measured by the measuring element 206x2 and 206y2, respectively, and calculates the angular position $\theta_b$ by calculating an arctangent of the y-component divided by the x-component. In some implementations, the angle calculation component 210b calculates a vector length $r_b$ based on the x-component value and the y-component value, as described above. The angle calculation component 210b may provide one or more signals indicating the vector length $r_b$ computed from the x-component value and the y-component value (e.g., when the angle calculation component 210b is configured to compute the vector length $r_b$) to the vector length check component 212b and/or one or more signals indicating the angular position $\theta_b$ to the angle compare component 216.

The angle compare component 216 may receive one or more signals indicating the angular position $\theta_a$ and one or more signals indicating the angular position $\theta_b$ from the angle calculation component 210a and the angle calculation component 210b, respectively. The angle compare component 216 may perform an angle comparison check based on the angular position $\theta_a$ and the angular position $\theta_b$. In some implementations, the angle compare component 216 may perform an angle comparison check based on the angular position $\theta_a$ and the angular position $\theta_b$ in a manner similar to that described above with respect to FIG. 1A. The angle compare component 216 may output a signal indicating a result of the angle comparison check to the digital output component 110.

As also shown in FIG. 2B, the vector length check component 212a receives the x-component value and the y-component value measured by the measuring element 206$x_1$ and 206$y_1$, respectively, and performs a vector check based on the x-component value and the y-component value. In some implementations, the vector length check component 212a performs the vector check in a manner similar to that described above with respect to FIGS. 1A and 1B. The vector length check component 212a may output a signal indicating a result of the vector length check component to the digital output component 110.

As shown in FIG. 2B, the x-component check component 214a receives the x-component value $x_1$ from the measuring element 206$x_1$ and receives the x-component value $x_2$ from the measuring element 206$x_2$. Because the set of sensing elements 202 and the set of sensing elements 204 are the same type of sensing elements, the x-component check component 214a may directly compare the x-component value $x_1$ and the x-component value $x_2$. In some implementations, the x-component check component 214a performs the comparison by determining whether the x-component value $x_1$ matches the x-component value $x_2$. That is, the x-component check component 214a may perform the comparison by determining whether a difference between the x-component value $x_1$ and the x-component value $x_2$ is less than a threshold value (e.g., a tolerance value). In some implementations, information indicating the threshold may be stored on the memory of the sensor 102. During operation, the x-component check component 214a may compare the computed difference between the x-component value $x_1$ and the x-component value $x_2$ to the threshold value. Here, if the difference does not satisfy (e.g., is greater than) the threshold value, then the x-component check component 214a may, for example, signal an error to the digital output component 110.

As shown in FIG. 2B, the y-component check component 214b receives the y-component value $y_1$ from the measuring element 206$y_1$ and receives the y-component value $y_2$ from the measuring element 206$y_2$. Because the set of sensing elements 202 and the set of sensing elements 204 are the same type of sensing elements, the y-component check component 214b may directly compare the y-component value $y_1$ and the y-component value $y_2$. In some implementations, the y-component check component 214b performs the comparison by determining whether the y-component value $y_1$ matches the y-component value $y_2$. That is, the y-component check component 214b may perform the comparison by determining whether a difference between the y-component value $y_1$ and the y-component value $y_2$ is less than a threshold value (e.g., a tolerance value). In some implementations, information indicating the threshold may be stored on the memory of the sensor 102. During operation, the y-component check component 214b may compare the computed difference between the y-component value $y_1$ and the y-component value $y_2$ to the threshold value. Here, if the difference does not satisfy (e.g., is greater than) the threshold value, then the y-component check component 214b may, for example, signal an error to the digital output component 110.

Utilizing the same type of sensing elements may provide an advantage in identifying faults due to the good matching between integrated identical devices which show only small deviations in their fabrication spread, nonlinearities, aging, and temperature dependencies. Consequently, performing the x-component check and/or the y-component check in addition to the vector length check (which needs compensation of those non ideal influences as described above), may increase the diagnostic coverage of the safety path 108. Furthermore, performing the vector length check in combination with x-component check and the y-component check enables an error to be identified in the x-component channel or the y-component channel. The remaining x-component channel or y-component channel of the angle measurement path experiencing the error may provide a x-component value or a y-component value which can still be used to crosscheck the output of the remaining angle measurement path.

In some implementations, as shown in FIG. 2C, the angle measurement path 104 and the angle measurement path 106 are diverse measurement paths. Thus, the set of sensing elements 202 on the angle measurement path 104 may in some implementations include a set of MR sensing elements, while the set of sensing elements 204 on the angle measurement path 106 may include a set of Hall-based sensing elements. As another example, the set of sensing elements 202 on the angle measurement path 104 may in some implementations include a first set of MR sensing elements (e.g., a set of AMR elements), while the set of sensing elements 204 on the angle measurement path 106 may include a second set of MR elements (e.g., a set of GMR elements or a set of TMR elements, among other examples). In some implementations, the measurement range provided by the set of sensing elements 202 is different from the measurement range provided by the set of sensing elements 204. As shown in FIG. 2C, the measurement range provided by the set of sensing elements 202 may be 360 degrees)(°. For example, the set of sensing elements 202 may include a set of GMR sensing elements, a set of TMR sensing elements, a set of Hall-based sensing elements, or the like. The measurement range provided by the set of sensing elements 204 may be 180°. For example, the set of sensing elements 204 may include a set of AMR sensing elements.

The use of diverse angle measurement paths 104/106 provided by the sets of sensing elements 202/204 provides both redundancy of angle measurement and diversity of sensing principle, thereby enhancing functional safety of the angle sensor 102. In some implementations, the set of sensors 202/204 may integrate gain and offset calibration including temperature compensation into the angle measurement paths 104/106 to account for deviations in the set of sensors 202/204 fabrication spread, nonlinearities, aging dependencies, and/or temperature dependencies which may result from the use of different types of sensors. In some implementations, the angle measurement paths 104/106 may also compensate harmonic components of the x-component signal and the y-component signal in order to achieve high accuracy of the angle measurement and high coverage of the safety path 108. The calibration and compensation of the angle measurement paths 104/106 can be done by parameters stored in an NVM based on end of line measurements and/or may utilize auto calibration algorithms, as discussed above.

As shown in FIG. 2C, the angle calculation component 210a receives the x-component value and the y-component value measured by the measuring element $206x_1$ and $206y_1$, respectively, and calculates the angular position $\theta_a$ by calculating an arctangent of the y-component divided by the x-component. In some implementations, the angle calculation component 210a calculates a vector length $r_a$ based on the x-component value and the y-component value, as described above. The angle calculation component 210a may provide one or more signals indicating the vector length $r_a$ computed from the x-component value and the y-component value (e.g., when the angle calculation component 210a is configured to compute the vector length $r_a$) to the vector length check component 212a and/or the one or more signals indicating the angular position $\theta_a$ to the angle compare component 216.

Similarly, the angle calculation component 210b receives the x-component value and the y-component value measured by the measuring element $206x2$ and $206y2$, respectively, and calculates the angular position $\theta_b$ by calculating an arctangent of the y-component divided by the x-component. In some implementations, the angle calculation component 210b calculates a vector length $r_b$ based on the x-component value and the y-component value, as described above. The angle calculation component 210b may provide one or more signals indicating the vector length $r_b$ computed from the x-component value and the y-component value (e.g., when the angle calculation component 210b is configured to compute the vector length $r_b$) to the vector length check component 212b and/or one or more signals indicating the angular position $\theta_b$ to the angle compare component 216.

The angle compare component 216 may receive one or more signals indicating the angular position $\theta_a$ and one or more signals indicating the angular position $\theta_b$ from the angle calculation component 210a and the angle calculation component 210b, respectively. The angle compare component 216 may perform an angle comparison check based on the angular position $\theta_a$ and the angular position $\theta_b$. In some implementations, the angle compare component 216 may perform an angle comparison check based on the angular position $\theta_a$ and the angular position $\theta_b$ in a manner similar to that described above with respect to FIG. 1A. The angle compare component 216 may output a signal indicating a result of the angle comparison check to the digital output component 110.

As also shown in FIG. 2C, the vector length check component 212b receives the x-component value and the y-component value measured by the measuring element $206x2$ and the measuring element $206y2$, respectively, and performs a vector check based on the x-component value and the y-component value. In some implementations, the vector length check component 212b performs the vector check in a manner similar to that described above with respect to FIGS. 1A and 1B. The vector length check component 212b may output a signal indicating a result of the vector length check component to the digital output component 110.

As shown in FIG. 2C, the x-component check component 214a receives the x-component value $x_1$ from the measuring element $206x_1$ and receives the x-component value $x_2$ from the measuring element $206x_2$. Because the set of sensing elements 202 and the set of sensing elements 204 are different types of sensing elements, the x-component check component 214a may utilize a comparison function to compare the x-component value $x_1$ and the x-component value $x_2$. In some implementations, the x-component check component 214a may utilize the following comparison function to compare the x-component value $x_1$ and the x-component value $x_2$:

$$2x_1-1-x_2$$

The x-component check component 214a may perform the comparison by determining whether a result of the comparison function satisfies (e.g., is less than) a threshold value (e.g., a tolerance value). In some implementations, information indicating the threshold value may be stored on the memory of the sensor 102. During operation, the x-component check component 214a may compare the computed result of the comparison function to the threshold value. Here, if the result of the comparison function does not satisfy (e.g., is greater than) the threshold value, then the x-component check component 214a may, for example, signal an error to the digital output component 110.

As shown in FIG. 2C, the y-component check component 214b receives x-component value $x_1$ from the measuring element $206x_1$, the y-component value $y_1$ from the measuring element $206y_1$, and receives the y-component value $y_2$ from the measuring element $206y_2$. Because the set of sensing elements 202 and the set of sensing elements 204 are different types of sensing elements, the y-component check component 214b may utilize a comparison function to compare the y-component value $y_1$ and the y-component value $y_2$. In some implementations, the y-component check component 214b may utilize the following comparison function to compare the y-component value $y_1$ and the y-component value $y_2$:

$$2x_1y_1-1-y_2$$

The y-component check component 214b may perform the comparison by determining whether a result of the comparison function satisfies (e.g., is less than) a threshold value (e.g., a tolerance value). In some implementations, information indicating the threshold value may be stored on the memory of the sensor 102. During operation, the y-component check component 214b may compare the computed result of the comparison function to the threshold value. Here, if the result of the comparison function does not satisfy (e.g., is greater than) the threshold value, then the y-component check component 214b may, for example, signal an error to the digital output component 110.

In some implementations, the x-component check component 214a may compute the result of the comparison function based on a normalized x-component value $x_1$, and a normalized x-component value $x_2$ and/or the y-component check component 214b may compute the result of the comparison function based on the normalized x-component value $x_1$, a normalized y-component value $y_1$, and a normalized y-component value $y_2$. For example, without auto calibration, a sufficient calibration of the x-components and y-components may not be possible, due to magnetic field dependency of the sets of sensors 202/204. The insufficient calibration of the x-components and the y-components may cause the safety path 108 to be vulnerable against variations of the magnetic field, which are caused by mechanical position variation between sensor and magnet or temperature dependence, fabrication spread and aging of the magnet.

In this case, the x-components and/or the y-components of the sets of sensors 202/204 may be normalized by the respective vector lengths determined by the vector length check components 212a/212b. In some implementations, the x-components and the y-components may be normalized by the respective vector lengths utilizing the following equations:

normalized x-component value $x_1 = x_1/\mathrm{sqrt}(x_1^2 + y_1^2)$;

normalized y-component value $y_1 = y_1/\mathrm{sqrt}(x_1^2 + y_1^2)$;

normalized x-component value $x_2 = x_2/\mathrm{sqrt}(x_2^2 + y_2^2)$;

normalized y-component value $y_2 = y_2/\mathrm{sqrt}(x_2^2 + y_2^2)$.

The number and arrangement of elements shown in FIGS. 2A-2C are provided as an example. In practice, there may be additional elements, fewer elements, different elements, or differently arranged elements than those shown in FIGS. 2A-2C.

Figure 3:
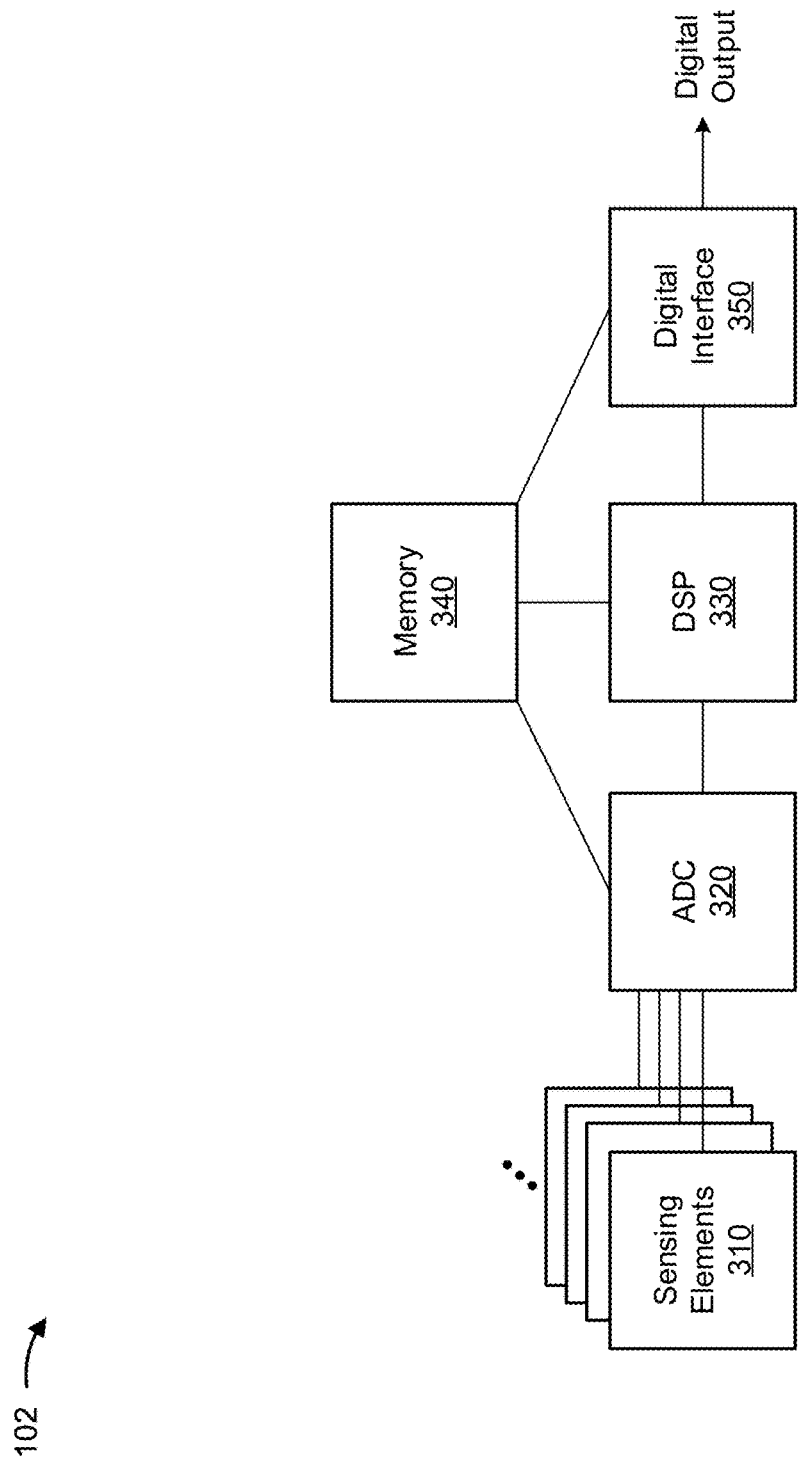
FIG. 3 is a diagram illustrating example hardware elements of an angle sensor described herein.

FIG. 3 is a diagram illustrating example hardware elements of angle sensor 102. As shown, angle sensor 102 may include sensing elements 310 (e.g., comprising at least two sets of elements), an ADC 320, a DSP 330, a memory element 340, and/or a digital interface 350.

Sensing element 310 includes an element for sensing a magnetic field present at sensing element 310. For example, sensing element 310 may include one or more Hall-based sensing elements that operate based on a Hall effect. As another example, sensing element 310 may include one or more magnetoresistive (MR) based sensing elements, where the electrical resistance of the magnetoresistive material may depend on a strength and/or a direction of the magnetic field present at the magnetoresistive material. Here, sensing element 310 may operate based on an anisotropic magnetoresistance (AMR) effect, a giant magnetoresistance (GMR) effect, a tunnel magnetoresistance (TMR) effect, and/or the like. As an additional example, sensing element 310 may include one or more variable reluctance (VR) based sensing elements that operate based on induction. In some implementations, a set of sensing elements 202 (e.g., sensing element 202x and sensing element 202y) and/or a set of sensing elements 204 (e.g., sensing element 204x and sensing element 204y) comprise one or more sensing elements 310.

ADC 320 includes one or more analog-to-digital converters that convert analog signals from sensing elements 310 to digital signals. For example, ADC 320 may convert an analog signal received from a set of sensing elements 310 to a digital signal to be processed by DSP 330. In some implementations, ADC 320 may provide a digital signal to DSP 330. In some implementations, angle sensor 102 may include one or more ADCs 320.

DSP 330 may include a digital signal processing device or a collection of digital signal processing devices. In some implementations, DSP 330 may receive digital signals from ADC 320 and may process the digital signals in association with selective performance of one or more safety checks, as described herein. In some implementations, DSP 330 may process the digital signals in order to form output signals, such as output signals associated with an angular position of a target object.

Memory element 340 includes a read only memory (ROM) (e.g., an EEPROM), a random access memory (RAM), and/or another type of dynamic or static storage device (e.g., a flash memory, a magnetic memory, an optical memory, etc.) that stores information and/or instructions for use by angle sensor 102, as described herein. In some implementations, memory element 340 may store information associated with processing performed by DSP 330. Additionally, or alternatively, memory element 340 may store configurational values or parameters for sensing element 310 and/or information for one or more other elements of angle sensor 102, such as ADC 320 or digital interface 350.

Digital interface 350 may include an interface via which angle sensor 102 may receive and/or provide information from and/or to another device, such as controller 112. For example, digital interface 350 may provide the output signal determined by DSP 330 to controller 112, and may receive information from controller 112.

The number and arrangement of elements shown in FIG. 3 are provided as an example. In practice, there may be additional elements, fewer elements, different elements, or differently arranged elements than those shown in FIG. 3. For example, angle sensor 102 may include one or more elements not shown in FIG. 3, such as a clock, an analog regulator, a digital regulator, a protection element, a temperature sensor, a stress sensor, and/or the like.

Figure 4:
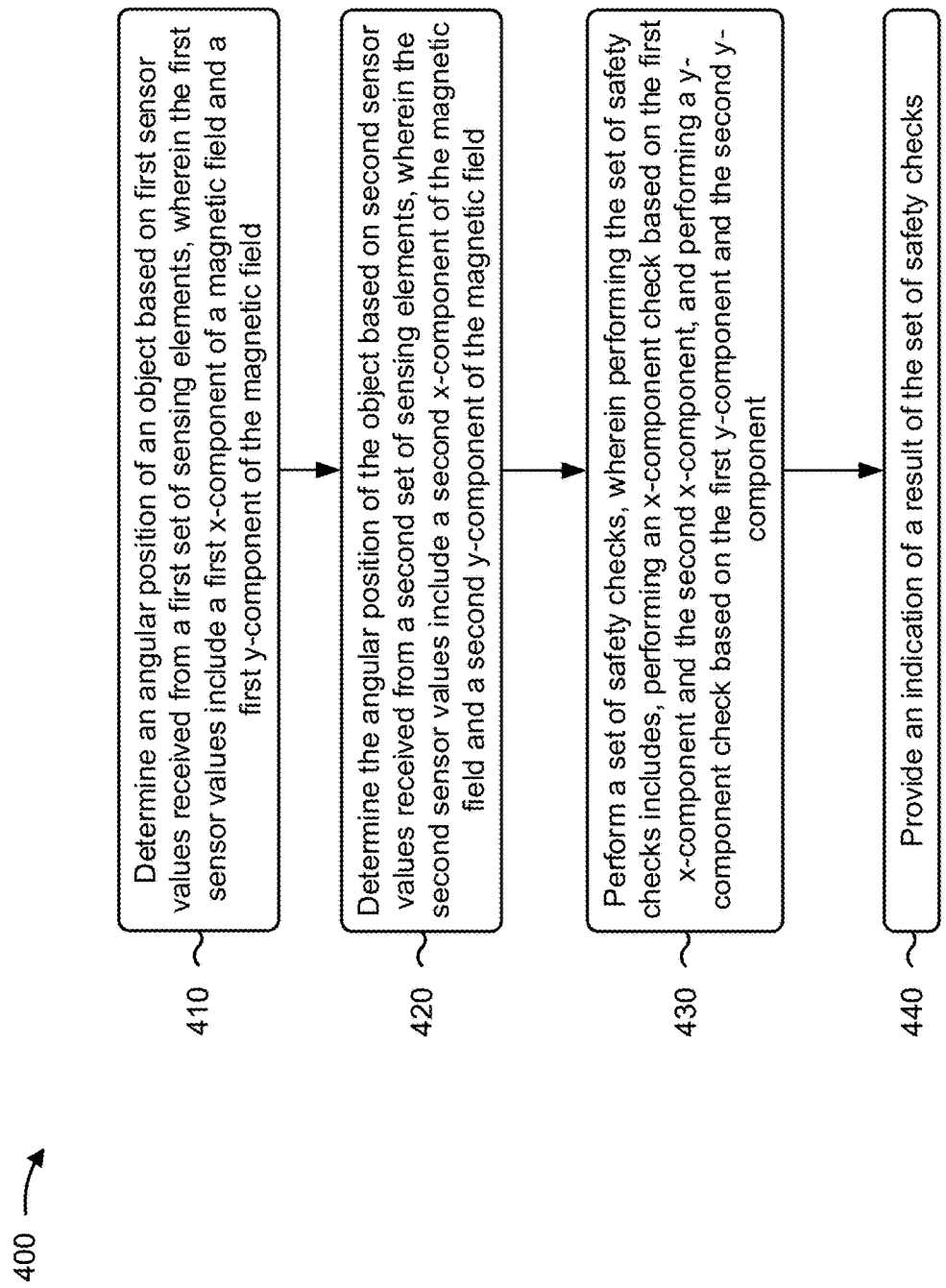
FIG. 4 is a flowchart of an example processes relating to a safety mechanism for an angle sensor.

FIG. 4 is a flowchart of an example process 400 associated with safety mechanism for high availability angle sensor. In some implementations, one or more process blocks of FIG. 4 may be performed by an angle sensor (e.g., angle sensor 102). In some implementations, one or more process blocks of FIG. 4 may be performed by another device or a group of devices separate from or including the angle sensor, such as a controller (e.g., controller 112).

As shown in FIG. 4, process 400 may include determining an angular position of an object based on first sensor values received from a first set of sensing elements, wherein the first sensor values include a first x-component of a magnetic field and a first y-component of the magnetic field (block 410). For example, the angle sensor may determine an angular position of an object based on first sensor values received from a first set of sensing elements, wherein the first sensor values include a first x-component of a magnetic field and a first y-component of the magnetic field, as described above. In some implementations, the first sensor values include a first x-component of a magnetic field and a first y-component of the magnetic field. In some implementations, the first set of sensing elements may include a set of inductive sensing elements and the second set of sensing elements may include a set of magnetic sensing elements. In some implementations, the first set of sensing elements may include a first set of inductive sensing elements and the second set of sensing elements may include a second set of inductive sensing elements.

As further shown in FIG. 4, process 400 may include determining the angular position of the object based on second sensor values received from a second set of sensing elements, wherein the second sensor values include a second x-component of the magnetic field and a second y-component of the magnetic field (block 420). For example, the angle sensor may determine the angular position of the object based on second sensor values received from a second set of sensing elements, wherein the second sensor values include a second x-component of the magnetic field and a second y-component of the magnetic field, as described above. In some implementations, the second sensor values include a second x-component of the magnetic field and a second y-component of the magnetic field.

As further shown in FIG. 4, process 400 may include performing a set of safety checks, wherein performing the set of safety checks includes: performing an x-component check based on the first x-component and the second x-component, and performing a y-component check based on the first y-component and the second y-component (block 430). For example, the angle sensor may perform a set of safety checks, wherein performing the set of safety checks includes: performing an x-component check based on the first x-component and the second x-component, and performing a y-component check based on the first y-component and the second y-component, as described above.

As further shown in FIG. 4, process 400 may include providing an indication of a result of the set of safety checks (block 440). For example, the angle sensor may provide an indication of a result of the set of safety checks, as described above.

Process 400 may include additional implementations, such as any single implementation or any combination of implementations described below and/or in connection with one or more other processes described elsewhere herein.

In a first implementation, performing the set of safety checks includes one or more of performing a first vector length check associated with the first set of sensing elements based on the first sensor values, performing a second vector length check associated with the second set of sensing elements based on the second sensor values, or performing a comparison check associated with the angular position as determined based on the first sensor values and the angular position as determined based on the second sensor values.

In a second implementation, alone or in combination with the first implementation, a measurement range associated with the first set of sensing elements is different from a measurement range associated with the second set of sensing elements, and wherein performing the set of safety checks includes determining a first vector length associated with the first x-component and the first y-component, determining a second vector length associated with the second x-component and the second y-component, normalizing, based on the first vector length, the first x-component and the first y-component to generate a normalized first x-component and a normalized first y-component, normalizing, based on the second vector length, the second x-component and the second y-component to generate a normalized second x-component and a normalized second y-component, performing the x-component check based on the normalized first x-component and the normalized second x-component, and performing the y-component check based on the normalized first y-component and the normalized second y-component.

In a third implementation, alone or in combination with one or more of the first and second implementations, the first set of sensing elements is a first MR sensing elements and the second set of sensing elements is a second set of MR sensing elements, a type of the second set of MR sensing elements being a different type from a type of the first set of MR sensing elements.

In a fourth implementation, alone or in combination with one or more of the first through third implementations, the first set of sensing elements and the second set of sensing elements are a same type of sensing element, and wherein performing the x-component check includes comparing the first x-component and the second x-component, and wherein performing the y-component check includes comparing the first y-component and the second y-component.

In a fifth implementation, alone or in combination with one or more of the first through fourth implementations, the first set of sensing elements is a set of MR sensing elements and the second set of sensing elements is a set of Hall-based sensing elements.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software. It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An angle sensor, comprising:
   a first angle measurement path to determine an angular position based on first sensor values from a first set of sensing elements,
      wherein the first sensor values include a first x-component of a magnetic field and a first y-component of the magnetic field;
   a second angle measurement path to determine the angular position based on second sensor values from a second set of sensing elements,
      wherein the second sensor values include a second x-component of the magnetic field and a second y-component of the magnetic field;
   a safety path to perform a set of safety checks, the set of safety checks including:
      an x-component check, wherein to perform the x-component check, the safety path is configured to:
         determine a difference between the first x-component and the second x-component, and
         determine whether the difference between the first x-component and the second x-component satisfies a first threshold, and
      a y-component check, wherein to perform the y-component check, the safety path is configured to:
         determine a difference between the first y-component and the second y-component, and
         determine whether the difference between the first y-component and the second y-component satisfies a second threshold; and
   an output component to provide an indication of a result of the set of safety checks.

2. The angle sensor of claim 1, wherein the set of safety checks further includes one or more of:
   a first vector length check associated with the first angle measurement path;
   a second vector length check associated with the second angle measurement path; or
   a comparison check associated with the angular position as determined on the first angle measurement path and the angular position as determined on the second angle measurement path.

3. The angle sensor of claim 1, wherein a measurement range on the first angle measurement path is different from a measurement range on the second angle measurement path.

4. The angle sensor of claim 1, where the safety path is to:
   determine a first vector length associated with the first x-component and the first y-component and a second vector length associated with the second x-component and the second y-component;
   normalize, based on the first vector length, the first x-component and the first y-component to generate a normalized first x-component and a normalized first y-component;
   normalize, based on the second vector length, the second x-component and the second y-component to generate a normalized second x-component and a normalized second y-component;
   perform the x-component check based on the normalized first x-component and the normalized second x-component; and
   perform the y-component check based on the normalized first y-component and the normalized second y-component.

5. The angle sensor of claim 1, wherein the first set of sensing elements is a first set of magnetoresistive (MR) sensing elements and the second set of sensing elements is a second set of MR sensing elements, a type of the second set of MR sensing elements being a different type from a type of the first set of MR sensing elements.

6. The angle sensor of claim 1, where the first set of sensing elements and the second set of sensing elements are a same type of sensing element, and wherein the safety path is to:
   output an error signal when the difference between the first x-component and the second x-component satisfies the first threshold; and
   output the error signal when the difference between the first y-component and the second y-component satisfies the second threshold.

7. The angle sensor of claim 1, wherein the first set of sensing elements is a set of magnetoresistive (MR) sensing elements and the second set of sensing elements is a set of Hall-based sensing elements.

8. The angle sensor of claim 1, wherein the first set of sensing elements is a set of inductive sensing elements and the second set of sensing elements is a set of magnetic sensing elements.

9. The angle sensor of claim 1, wherein the first set of sensing elements is a first set of inductive sensing elements and the second set of sensing elements is a second set of inductive sensing elements.

10. A sensor system, comprising:
    a first set of sensing elements to obtain first sensor values associated with a rotation of an object,
       wherein the first sensor values include a first x-component of a magnetic field and a first y-component of the magnetic field;
    a second set of sensing elements to obtain second sensor values associated with the rotation of the object,
       wherein the second sensor values include a second x-component of the magnetic field and a second y-component of the magnetic field;
    a first angle measurement path to determine an angular position based on the first sensor values;
    a second angle measurement path to determine the angular position based on the second sensor values;
    a safety path to perform a set of safety checks, the set of safety checks including:
       an x-component check, wherein to perform the x-component check, the safety path is configured to:
          determine a difference between the first x-component and the second x-component, and
          determine whether the difference between the first x-component and the second x-component satisfies a first threshold, and
       a y-component check, wherein to perform the y-component check, the safety path is configured to:
          determine a difference between the first y-component and the second y-component, and
          determine whether the difference between the first y-component and the second y-component satisfies a second threshold; and
    an output component to provide an indication of a result of the set of safety checks.

11. The sensor system of claim 10, wherein the set of safety checks further includes one or more of:
    a first vector length check associated with the first angle measurement path;
    a second vector length check associated with the second angle measurement path; or a comparison check associated with the angular position as determined on the first angle measurement path and the angular position as determined on the second angle measurement path.

12. The sensor system of claim 10, wherein a measurement range on the first angle measurement path is different from a measurement range on the second angle measurement path.

13. The sensor system of claim 12, where the safety path is to:
determine a first vector length associated with the first x-component and the first y-component and a second vector length associated with the second x-component and the second y-component;
normalize, based on the first vector length, the first x-component and the first y-component to generate a normalized first x-component and a normalized first y-component;
normalize, based on the second vector length, the second x-component and the second y-component to generate a normalized second x-component and a normalized second y-component;
perform the x-component check based on the normalized first x-component and the normalized second x-component; and
perform the y-component check based on the normalized first y-component and the normalized second y-component.

14. The sensor system of claim 10, wherein the first set of sensing elements is a first magnetoresistive (MR) sensing elements and the second set of sensing elements is a second set of MR sensing elements, a type of the second set of MR sensing elements being a different type from a type of the first set of MR sensing elements.

15. The sensor system of claim 10, where the first set of sensing elements and the second set of sensing elements are a same type of sensing element, and wherein the safety path is to:
output an error signal when the difference between the first x-component and the second x-component satisfies the first threshold; and
output the error signal when the difference between the first y-component and the second y-component satisfies the second threshold.

16. The sensor system of claim 10, wherein the first set of sensing elements is a set of magnetoresistive (MR) sensing elements and the second set of sensing elements is a set of Hall-based sensing elements.

17. The sensor system of claim 10, wherein the first set of sensing elements is a set of inductive sensing elements and the second set of sensing elements is a set of magnetic sensing elements.

18. The sensor system of claim 10, wherein the first set of sensing elements is a first set of inductive sensing elements and the second set of sensing elements is a second set of inductive sensing elements.

19. A method, comprising:
determining, by a system, an angular position of an object based on first sensor values received from a first set of sensing elements,
wherein the first sensor values include a first x-component of a magnetic field and a first y-component of the magnetic field;
determining, by the system, the angular position of the object based on second sensor values received from a second set of sensing elements,
wherein the second sensor values include a second x-component of the magnetic field and a second y-component of the magnetic field;
performing, by the system, a set of safety checks, wherein performing the set of safety checks includes:
performing an x-component check based on:
determining a difference between the first x-component and the second x-component, and
determining whether the difference between the first x-component and the second x-component satisfies a first threshold, and
performing a y-component check based on:
determining a difference between the first y-component and the second y-component, and
determining whether the difference between the first y-component and the second y-component satisfies a second threshold; and
providing, by the system, an indication of a result of the set of safety checks.

20. The method of claim 19, wherein a measurement range associated with the first set of sensing elements is different from a measurement range associated with the second set of sensing elements, and wherein performing the set of safety checks includes:
determining a first vector length associated with the first x-component and the first y-component;
determining a second vector length associated with the second x-component and the second y-component;
normalizing, based on the first vector length, the first x-component and the first y-component to generate a normalized first x-component and a normalized first y-component;
normalizing, based on the second vector length, the second x-component and the second y-component to generate a normalized second x-component and a normalized second y-component;
performing the x-component check based on the normalized first x-component and the normalized second x-component; and
performing the y-component check based on the normalized first y-component and the normalized second y-component.

* * * * *